United States Patent [19]

Villar et al.

[11] Patent Number: 6,060,535

[45] Date of Patent: May 9, 2000

[54] CEMENTING COMPOSITIONS AND APPLICATIONS OF SUCH COMPOSITIONS TO CEMENTING OIL (OR SIMILAR) WELLS

[75] Inventors: John Villar, Hafrsfjord, Norway; Jean-Francois Baret, Paris, France; Michel Michaux, Verrieres-le-Buisson, France; Bernard Dargaud, Elancourt, France

[73] Assignee: Schlumberger Technology Corporation, Sugar Land, Tex.

[21] Appl. No.: 08/877,112

[22] Filed: Jun. 17, 1997

[30] Foreign Application Priority Data

Jun. 18, 1996 [FR] France ................................. 96 07554
Feb. 12, 1997 [FR] France ................................. 97 01849

[51] Int. Cl.$^7$ ....................................................... C09K 7/00
[52] U.S. Cl. ................................................................ 523/130
[58] Field of Search .................................................. 523/130

[56] References Cited

U.S. PATENT DOCUMENTS

| | | |
|---|---|---|
| 3,581,825 | 6/1971 | Messenger . |
| 4,234,344 | 11/1980 | Tinsley et al. . |
| 4,915,740 | 4/1990 | Sakai et al. . |
| 4,960,465 | 10/1990 | Asfaei .................................. 106/724 |
| 5,226,961 | 7/1993 | Nahm et al. . |
| 5,488,992 | 2/1996 | Cowon et al. .......................... 166/293 |

FOREIGN PATENT DOCUMENTS

| | | |
|---|---|---|
| 0 621 247 A2 | 10/1994 | European Pat. Off. . |
| 96 07544 | 6/1996 | France . |
| 97 01849 | 2/1997 | France . |
| 1279096 | 2/1969 | United Kingdom . |
| 2 179 933 | 9/1986 | United Kingdom . |
| 2179933 | 3/1987 | United Kingdom . |

OTHER PUBLICATIONS

J.F. Baret, J.P. Villar, M. Michaux, *Schlumberger Dowell*, "Cementing Conductor Pipes Under Deep Water", Offshore Mediterranean Conference 97, pp. 887–898.

French Search Report, Mar. 17, 1997, France.

*Primary Examiner*—Edward J. Cain
*Attorney, Agent, or Firm*—Douglas Y'Barbo; Robin D. Nava

[57] ABSTRACT

The present invention concerns a cementing composition for an oil (or similar) well, based on an aluminous hydraulic cement, fine particles, hollow microspheres, water in a quantity such that the porosity is in the range 25% to 50%, a dispersing agent, a setting accelerator for the aluminous cement and optionally, other conventional additives. The invention is of particular application to cementing conductor pipes in arctic zones or in deep-water wells.

24 Claims, 7 Drawing Sheets

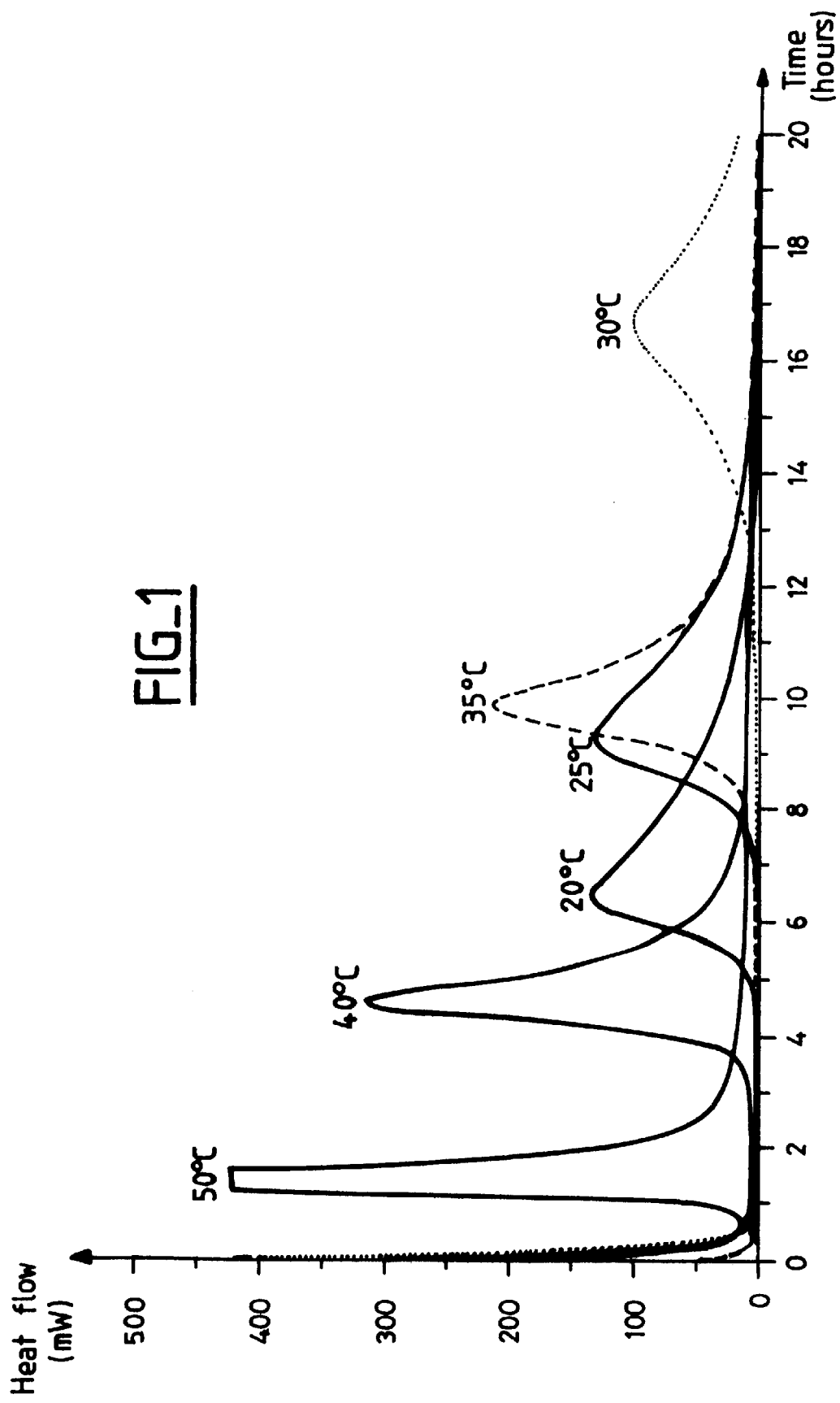
FIG_1

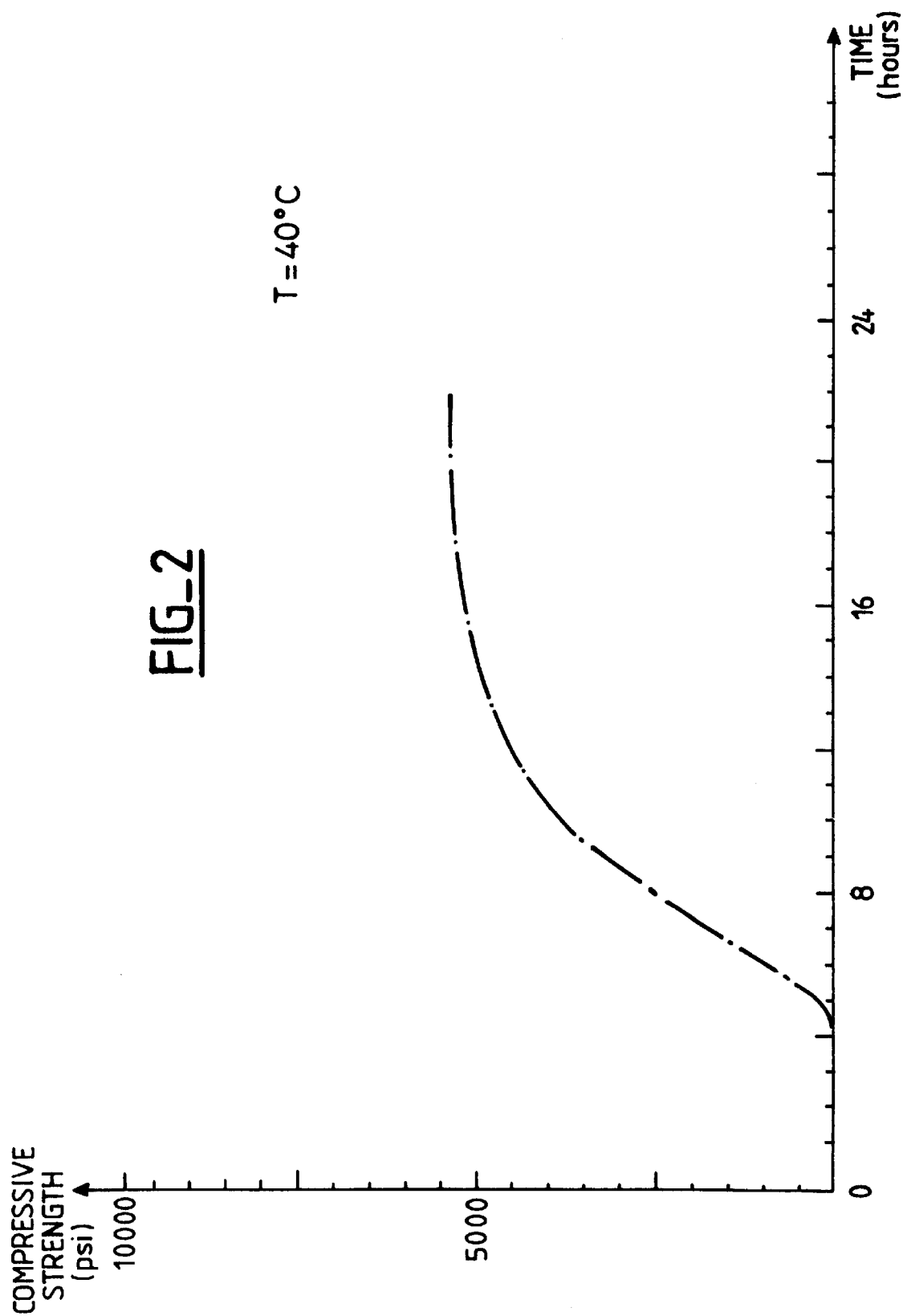
FIG_2

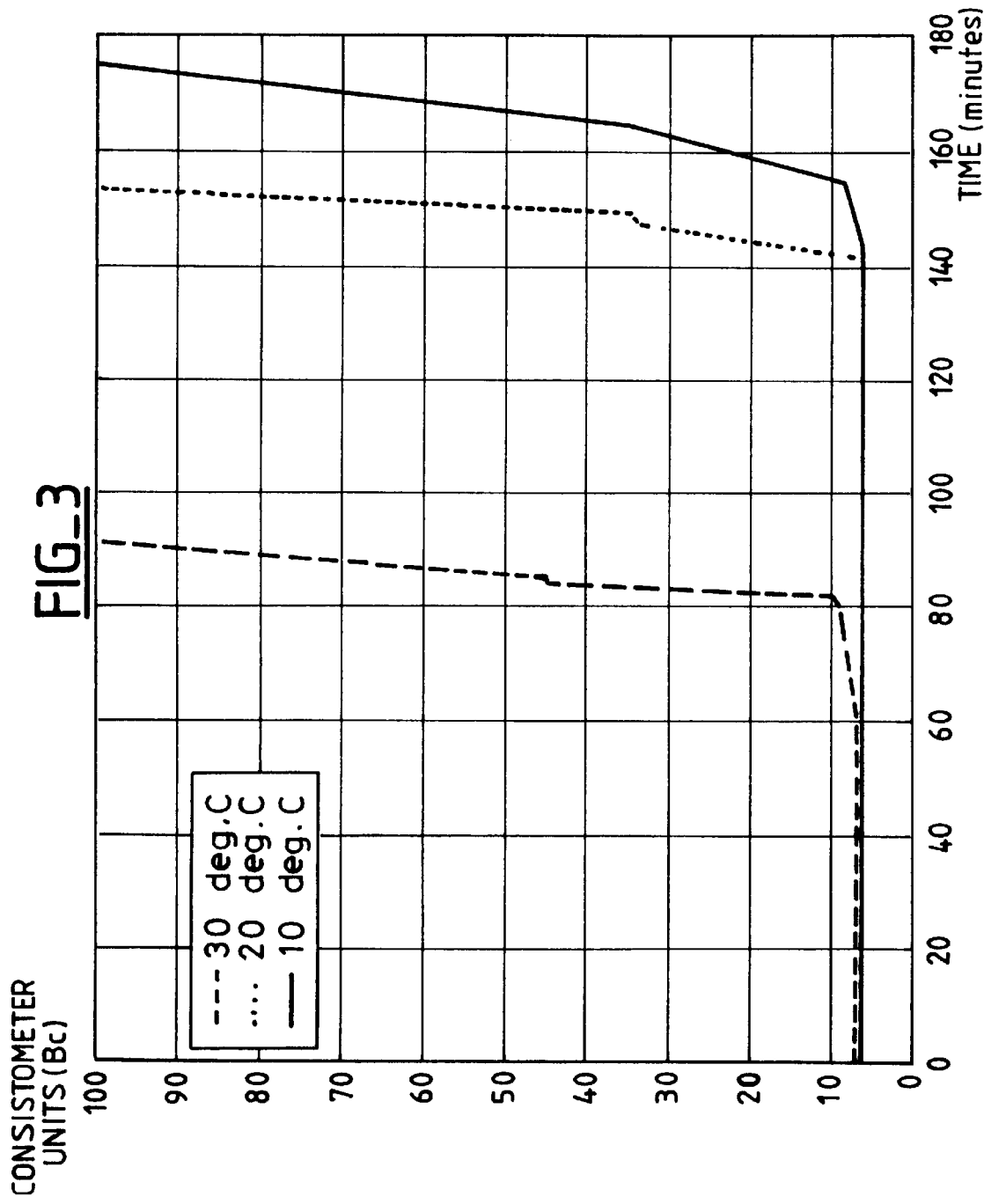

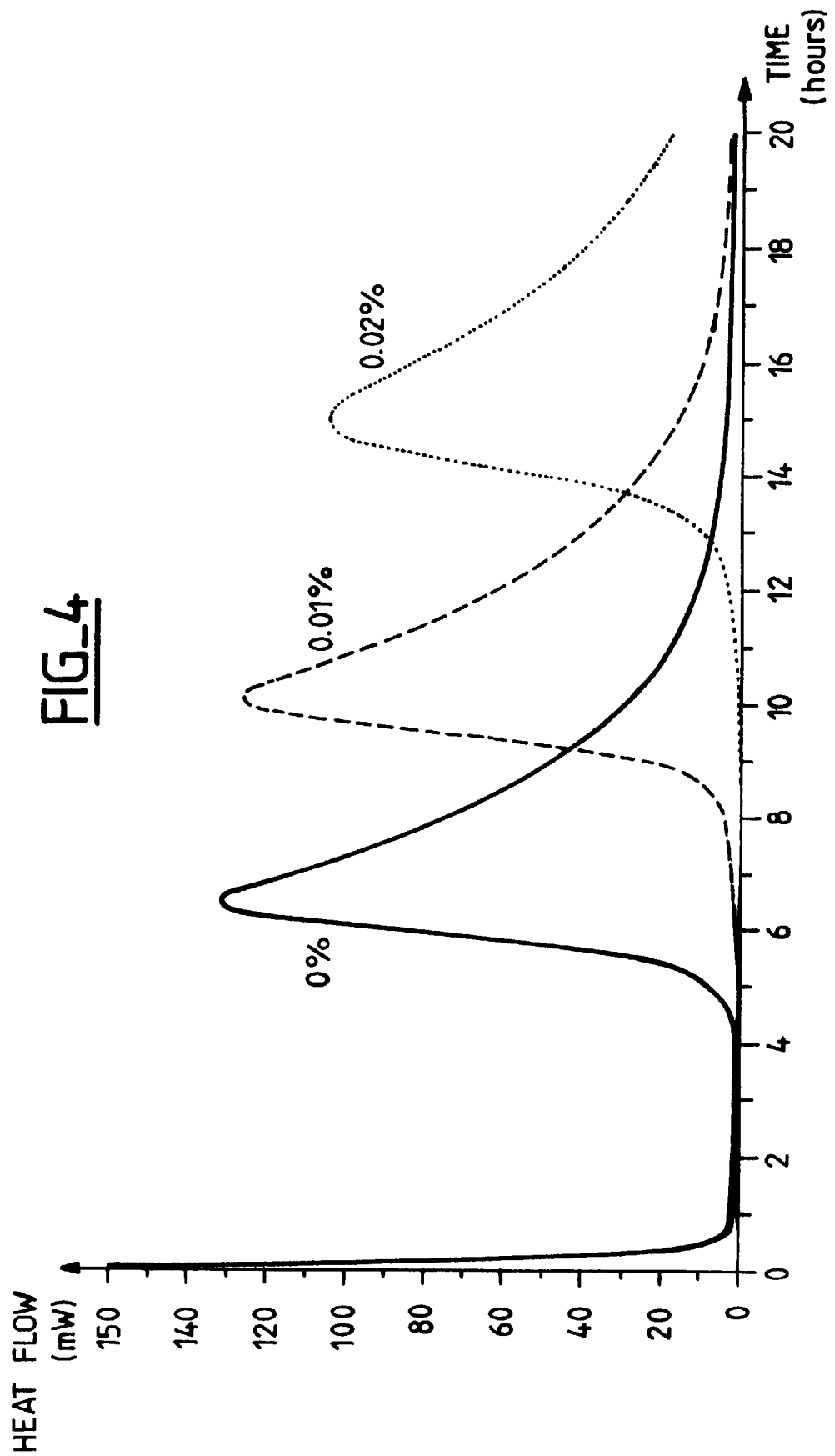

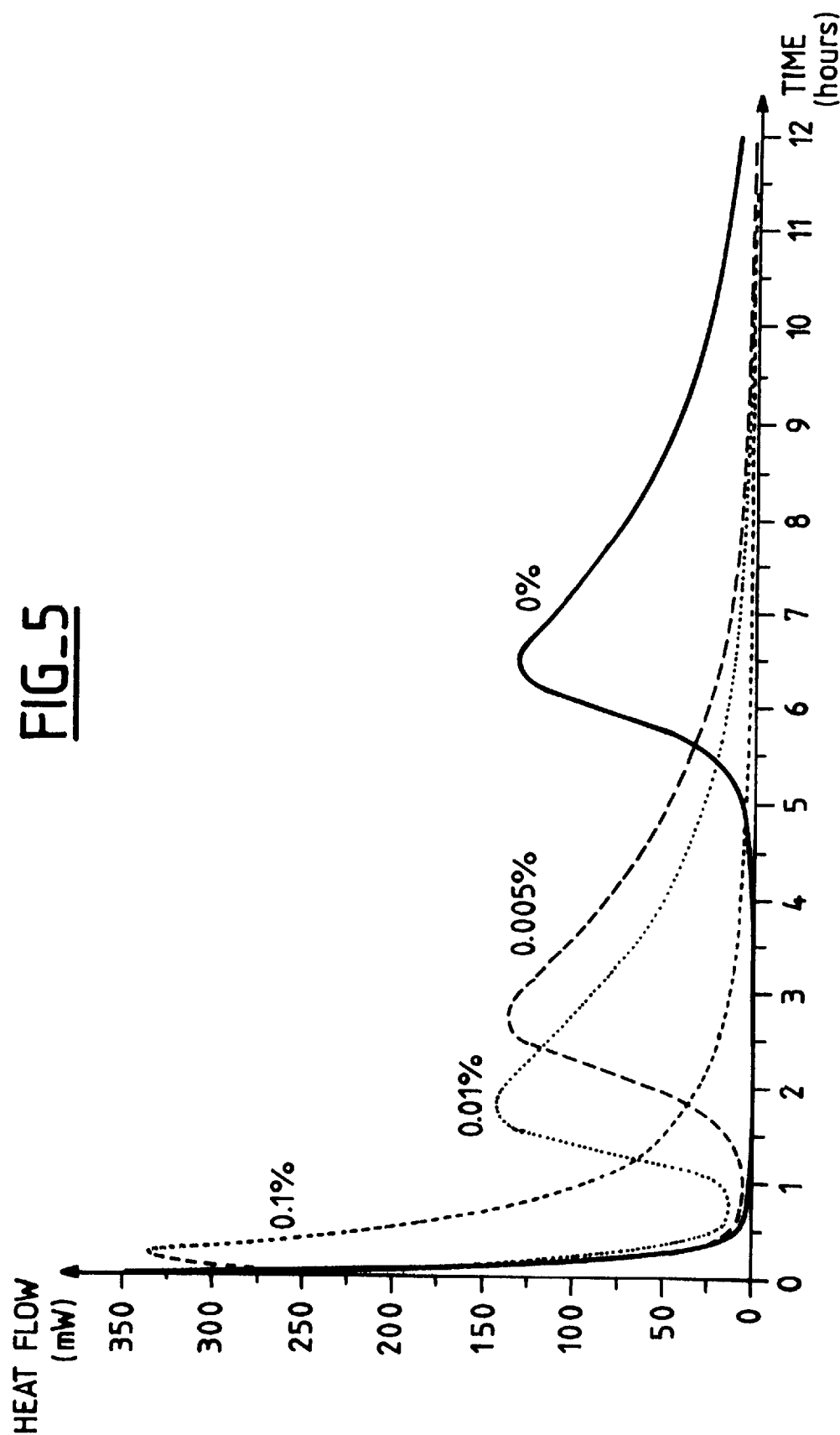
FIG_5

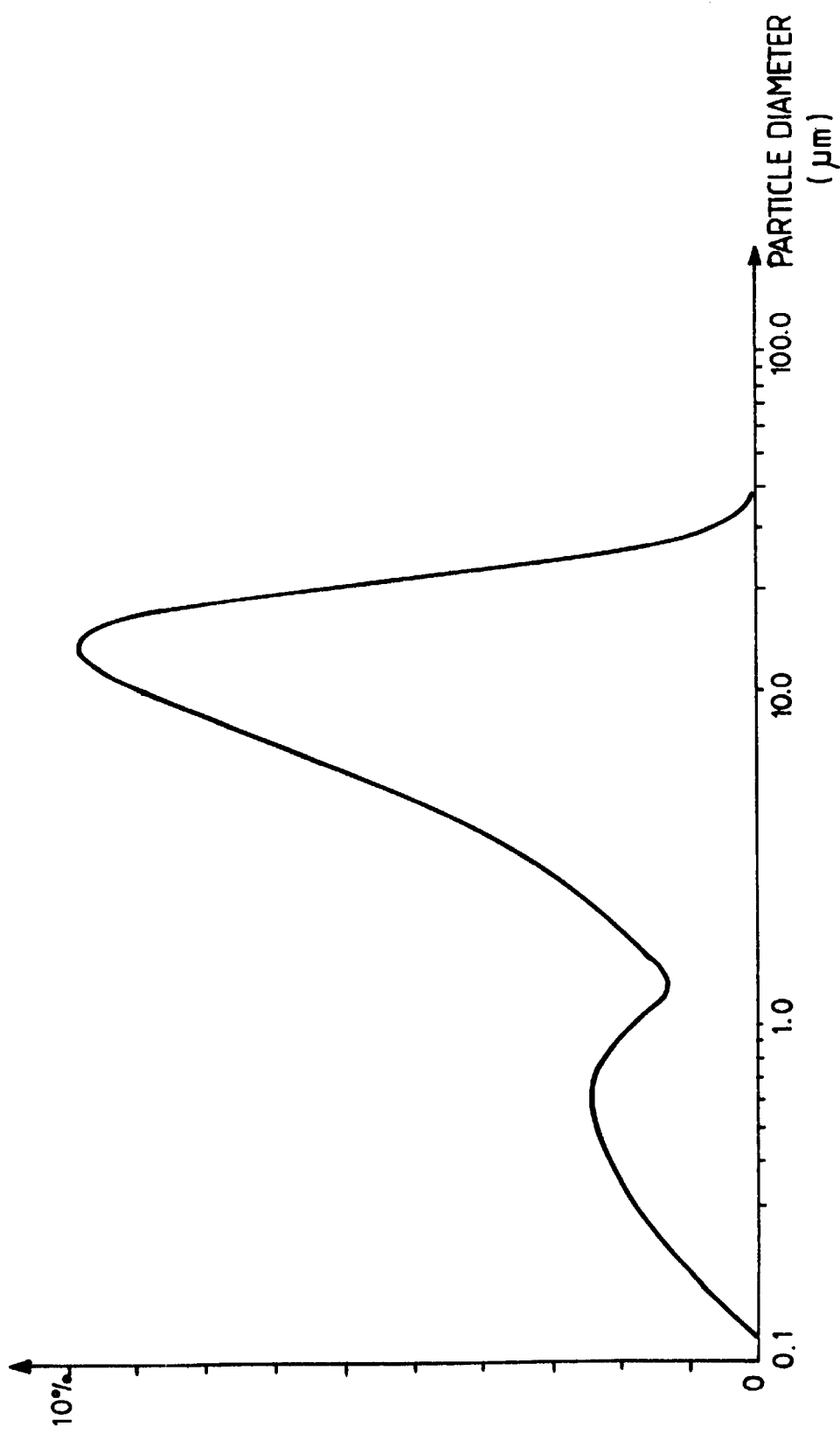

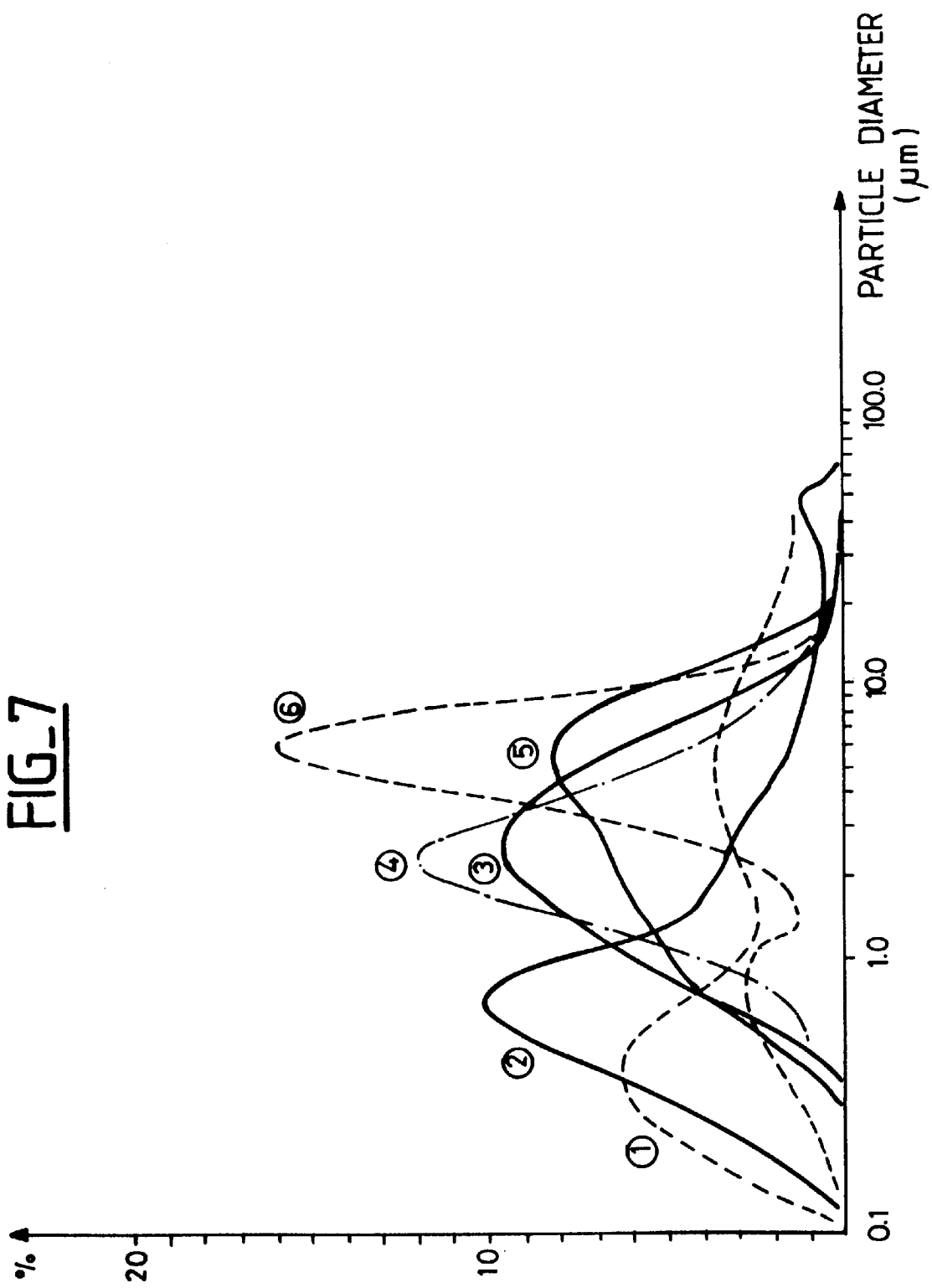

CEMENTING COMPOSITIONS AND APPLICATIONS OF SUCH COMPOSITIONS TO CEMENTING OIL (OR SIMILAR) WELLS

The present invention relates to oil, gas, water, geothermal or similar well drilling techniques. More precisely, the invention concerns cementing compositions which are particularly adapted to low temperatures.

After drilling an oil (or similar) well, a casing or coiled tubing is lowered into the well and is cemented over all or a portion of its height. Cementing serves, in particular, to prevent fluid exchange between the different formation layers through which the well passes, to prevent gas from rising in the annular space surrounding the casing, or to limit the ingress of water into the production well. Its principal function, of course, is to hold the casing in position.

With offshore drilling in particular, special attention must be paid to the first section of the casing, known as the conductor pipe, which is lowered from the well head, in this case on the sea bed, since the first column acts as a guide for the rest of the hole, and so the tolerance on its inclination cannot be more than a few degrees.

As it is not very long, the conductor pipe is very sensitive to the well head temperature. In the case of deep water wells, this temperature is that of the ocean bed, namely 4° C. It can be as low as 0° C. in arctic regions. Cements for the oil industry, however, are normally designed for a temperature of more than 50° C. with a setting time which increases as the temperature drops. In the limit, in arctic regions, the Portland cement slurries which are normally used may freeze.

Various additives which are intended to accelerate the setting time are known, but under extreme conditions they reach their limits, with disastrously negative effects on the quality of the cement slurry and on that of the set cement. This has led to the development of formulations based on specific cements which are essentially classified into two types: formulations based on plaster and formulations based on aluminous cements. Plaster-based formulations, or more precisely plaster/Portland cement mixtures, are preferred by many authors over formulations based on aluminous cements since aluminous cements give off a large amount of heat over a very short time lapse which can thaw the formation surrounding the bore hole. (See French patent FR-A-2 376 620; and United States patents U.S. Pat. No. 3,581,825; U.S. Pat. No. 3,891,454; U.S. Pat. No. 4,176,720; U.S. Pat. No. 4,482,379; U.S. Pat. No. 5,346,550; U.S. Pat. No. 5,447,198).

The setting time, however, remains long. In particular, the time spent waiting on cement (WOC), i.e., the period between pumping and the moment when the cement develops sufficient strength to support the conductor pipe, is about twenty hours or even more. During the whole of this period, drilling operations are interrupted and the drilling crew is stopped, leading to very high peripheral costs.

Further, ocean floors are often sandy and poorly consolidated. This means that low density cement slurries must be used, generally in the range 11 ppg to 13 ppg (pounds per gallon, i.e., 1.32 g/cm$^3$ to 1.56 g/cm$^3$). A cement slurry is generally lightened by increasing the quantity of water and—in order to avoid separation of the liquid and solid phases—the viscosity of the liquid phase is increased by addition of bentonite or sodium silicate in particular. Where an ordinary cement normally has a water/solids weight ratio in the range 38% to 46%, in slurries with this low a density this ratio is currently more than 50% or even more than 60%. Such quantities of water retard the development of compressive strength and thus increase the waiting on cement time.

A slurry can also be lightened by adding an inert gas (cement foam; see U.S. Pat. No. 5,484,019) or light materials such as silica dust (FR-A-2 463 104), or hollow ceramic or glass spherules (U.S. Pat. No. 3,804,058; U.S. Pat. No. 3,902,911 or U.S. Pat. No. 4,252,193). Such materials can reduce but not replace the amount of additional water added to the cement slurry to lighten it so that the development of compressive strength is less retarded. Nevertheless, the quantity of water required remains high and after 24 hours, the compressive strength remains very low, generally not exceeding 600 pounds per square inch (psi; 4136 kPa).

An aluminous cement/water/microsphere formulation is known from United States patent U.S. Pat. No. 4,234,344 which relates to cementing compositions which are subjected to high temperatures, in particular for a steam injection well. For an experimental well, that patent describes the use of a formulation constituted by 100 parts (by weight) of Ciment Fondu (trade mark of an aluminous cement containing 40% of alumina sold by Lafarge, France), 55.5 parts of hollow glass spherules, 65 parts of silica flour, 0.5 parts of dispersing agent and 110 parts of water. No data is given for the setting time and the compressive strength.

The aim of the present invention is to provide novel low temperature, low density cementing formulations which can develop compressive strength rapidly.

The invention thus provides a formulation based on a hydraulic aluminous cement which is characterized by a very low porosity (porosity equals the ratio of the volume of water to the total volume of the slurry) which is typically in the range 0.25 to 0.50, preferably in the range 0.30 to 0.40, and by the addition of a light material and fine particles.

In general, a dispersing agent is added to the composition as well as a cement setting accelerator, the dispersing agents which are known in the art generally having a retarding effect on cement setting which must be compensated for. Paradoxically, this retarding effect is desirable when preparing the slurry since mixing is carried out on the surface, and hence at a temperature which is usually around 20° C., so the slurry has a greater tendency to set on the drilling platform than in the well. Other conventional additives can be added, in particular anti-foaming agents, filtrate control agents or gas migration control agents.

The solid particles of the mixture are preferably in respective proportions such that the packing density of the mixture is maximised. The addition of fine particles can produce PVF (packing volume fraction) values which are preferably more than 0.75, more preferably more than 0.8. In this way, mixing the formulation presents no particular difficulties even at porosities which are as low as those of the invention. Further, highly satisfactory rheologies are obtained under good pumping conditions, in particular with an almost complete absence of sedimentation.

The fraction of the mixture which is constituted by fine particles can in particular be constituted by ground quartz or glass, finely ground calcium carbonate, microfine silica (micro-silica), carbon black, iron oxide dust, red mud or screened fly ash. In general, suitable substances are substances which are compatible with aluminous cement and have an average diameter of the order of half to 1/100th the average diameter of the cement particles (i.e., between 0.075 microns ($\mu$) and 7.5 $\mu$). Quartz, which is a low reactivity crystalline material, is more particularly preferred.

The aluminous cements considered for use in the present invention are cements in which the monocalcium aluminate (CA) content is greater than or equal to 40%, with a particularly low silica content when compared with ordinary cements, in particular Portland type cements. Particular examples of commercial products which can be used in the present invention are Ciment Fondu, Secar 51 (Lafarge), CA 14M aluminous cement from Alcoa, and Lumnite.

On hydration, CA forms a hexagonal compound CAH10 which corresponds to the very rapid development of compressive strength. At 20° C., 80% of the final strength is reached in 24 hours whereas this may take several days with a Portland type cement. Because of this, aluminous cements are remarkably suitable for the applications envisaged here. However, aluminous cements are considered to be very sensitive to contaminants and are thus little used.

As mentioned above, the formulations of the invention have very low porosities, and more remarkably the densities are among the lowest. The low density required is obtained not by adding larger quantities of water as in the prior art but by adding a very light material constituted, for example, by hollow microspheres, preferably with a relative density of less than 0.8. Preferably, the microspheres have an average diameter in the range 2 to 20 times the average diameter of the aluminous cement particles. Silico-aluminates or cenospheres (the residue obtained from charcoal combustion) are particularly suitable, in which the average diameter is of the order of 150 $\mu$ (i.e., about 10 times the average diameter of Ciment Fondu). Hollow glass spherules are also suitable.

The solid phase of the composition is preferably constituted by 35% to 65% (by volume) of cenospheres, 20% to 45% of aluminous cement and 5% to 25% of fine particles. In a particularly preferred variation, part of the aluminous cement is replaced by silica flour (added in a quantity which is generally in the range 5% to 30% by volume of the solid phase.). Fly ash or blast furnace slag can also be used as a partial substitution material for the aluminous cement. With the addition of such a diluting agent—silica flour, fly ash or slag—the aluminous cement constitutes only about one-third of the solid fraction of the formulation so the heat released by the hydration reaction of the cement is minimised. Further, as taught in U.S. Pat. No. 3,581,825, the hydration reaction can be modulated by adding a small amount of clay (in particular attapulgite or, preferably, bentonite).

If the sediments through which the wells are drilled are particularly unstable, the density of the cement slurry may have to be adjusted to a lower value than that which may be used with hollow microspheres. In this case air or nitrogen bubbles are used as material for lightening the slurry as desired. The manufacture of foam cement is known to the person skilled in the art and numerous oil wells are currently treated with such cements. The quantity of gas included in the cement (quality of the foam) lies in the range 10% to 60%, and the best results are generally achieved in the range 20% to 40%. The formulation of the invention is thus constituted by a base slurry made from aluminous cement which can optionally be mixed with other mineral particles to become thicker or thinner, as described above.

Further advantageous characteristics and details of the invention become apparent from the following description which is made with reference to tests carried out on different examples of additive compositions, and given with reference to the figures in which:

FIG. 1 is a characteristic setting curve for an aluminous cement under static conditions, for temperatures in the range 20° C. to 50° C;

FIG. 2 is a characteristic curve for the development of compressive strength for an aluminous cement at 10° C;

FIG. 3 is a characteristic setting curve for an aluminous cement under dynamic conditions, for temperatures in the range 10° C. to 30° C.;

FIG. 4 is a curve illustrating the retarding effect of a dispersing agent on setting of an aluminous cement;

FIG. 5 is a curve illustrating the accelerating effect on setting obtained with lithium carbonate;

FIG. 6 is a particle distribution curve for the aluminous cement used in the tests reported in the present document; and FIG. 7 is a distribution curve for the different fine particles used in the invention.

The aluminous cements used in the present invention are cements in which the monocalcium aluminate content is not less than 40%. The secondary mineralogical phases are essentially $C_{12}A_7$, $C_2S$, ferrites and $C_4AF$, these substances being given the following references as are common for cement: $C=CaO$, $A=Al_2O_3$, $S=SiO_2$, $F=Fe_2O_3$. Particularly suitable aluminous cements are those sold by Lafarge under the trade name Ciment Fondu which is constituted by $Al_2O_3$ (37.5–41.5%), CaO (36.5–39.5%), $SiO_2$ (2.5–5.0%) and $Fe_2O_3$+FeO (14.0–18.0) (percentages by weight).

Analysis of setting under static conditions for Ciment Fondu shows a regular increase in the setting time on decreasing temperature to about 30° C. and, in characteristic manner, a reduction in the setting time for lower temperatures. This can be seen, for example, in the tests marked in FIG. 1 and obtained with a slurry which was constituted simply by Ciment Fondu, water (water/cement weight ratio= 0.46) and an anti-foaming agent in an amount of 0.05 gal/sk (i.e. U.S. gallons per 94 pound sack of cement; a concentration of 0.1 gal/sk or 0.1 gps corresponds to 0.90 liters of dispersing agent per 100 kg of cement). The heat released by the hydration reaction is plotted up the ordinate.

At low porosities, aluminous cements develop compressive strength particularly rapidly. Thus with a slurry identical to that used for the preceding test, but with a water/cement ratio of 40% by weight, it can be seen from FIG. 2 that after only 10 hours setting at 10° C. (at a pressure of 400 pounds per square inch (psi) [2758 kpa]), about 80% of the final strength had already developed.

However, for setting time under dynamic conditions, i.e., under the conditions recommended in the API (American Petroleum Institute) Spec. 10 for measuring so-called thickening time, it should be noted that the behavior of a cement slurry is very different. FIG. 3 shows how the consistency of a slurry prepared under the test conditions of FIG. 1 varies over time. Consistency was measured in standardised BC units. A slurry with a consistency of more than 100 BC is generally not pumped. It can be seen that within a few minutes, the consistency of the slurry passed from less than 10 BC to the limiting consistency of 100 BC. Further, and in contrast to that which would be predicted from tests carried out under static conditions, the thickening time increased substantially between 30° C. and 10° C.

The formulations used in the above tests did not contain a dispersing agent. While it is possible to prepare such formulations in the laboratory by vigorous stirring while mixing is taking place, in practice a dispersing agent is necessary once the quantities to be prepared become large. Conventional dispersing agents are generally compatible with the aluminous cements. Particular examples are citric acid, sodium salts and in particular sodium gluconate, and sulfonate derivatives such as polymelamine sulfonates or polynaphthalene sulfonates, in particular sodium polynaphthalene sulfonate/formaldehyde. These dispersing agents, however, have a considerable retarding effect on cement setting. Thus, as shown in FIG. 4, at 20° C. with a slurry constituted by Ciment Fondu and water (46% by weight), the setting time was almost doubled by the addition of 0.01% of sodium gluconate.

This retarding effect on setting can be compensated for in the invention by adding sodium silicate, calcium hydroxide, lithium hydroxide or a lithium salt, in particular lithium carbonate. This accelerating effect on the setting of aluminous cement is shown in FIG. 5 which plots the heat released by the hydration reaction against time of a formulation which was constituted simply by Ciment Fondu and water (46% of water with respect to the weight of cement), at 20° C., at various concentrations of lithium carbonate. Remarkably, the effect is relatively progressive and the setting time can be modified voluntarily depending on requirements.

In the case of cement/microsphere/water formulations, as in patent U.S. Pat. No. 4,234,344, large quantities of water are required to enable the mixture to be pumped. This has a deleterious effect on the development of compressive strength. In the invention, the desired Theological properties are obtained, in particular, by adding fine particles which increases the compactness of the mixture of solids. The formulations are preferably such that the PVF of the mixture is more than 0.8, preferably 0.85—in other words, an extremely high packing factor. This can be obtained, in particular, by employing the conditions recommended in French patent FR-A-2 704 218: at least three solid species with non-overlapping ranges of grain sizes of which at least one is constituted by fine particles, in relative proportions which maximise packing (with a PVF, or volume fraction of solid particles on packing, which is the maximum or close to the maximum for the selected combination of solid species), and a solid material concentration in the slurry which is above the concentration threshold at which hindered settling occurs.

The grain size distribution of an aluminous 40% Ciment Fondu type cement (Lafarge—France) is very close to that of a G class Portland cement, as can be seen from FIG. 6. The average particle diameter is close to 15 $\mu$. The cenospheres have an average diameter of about 150 $\mu$.

From these two materials, to obtain good compactness in the solid mixture, the fine fraction of the mixture must be constituted by particles with an average diameter in the range 0.1 microns to 5 microns. This is true in particular with particles such as those shown in the grain size distribution curve shown in FIG. 7: red mud, carbon black, iron oxide dust, screened fly ash, fine calcium carbonate or finely ground quartz. This is also the case with styrene-butadiene latexes such as those described in patent EP-0 091 377 or fine titanium oxide used as pigment in paints.

Fly ash is a residue from the combustion of charcoal, particularly in thermal power stations. In modem installations, the burners are supplied with charcoal which has already been powdered. The unburned fraction is vaporised in the smoke and condenses on cooling in the form of finely divided particles which are approximately spherical. The electrostatic precipitators in the chimney capture all particles below 200 $\mu$ so the particle grain size distribution is about the same as that of an ordinary cement. After screening, in particular using a 50 micron screen, the majority of particles have a diameter in the range 1 micron to 10 microns, suitable in particular for use as the fine particles in formulations of the invention.

EXAMPLE 1

Different cement slurries based on Ciment Fondu (Lafarge) were prepared in accordance with API standards. For all the formulations, porosity was fixed at 40%, slurry density was 1.56 g/cm$^3$ (13 ppg). Apart from the Ciment Fondu (density 3.23), the solid fraction of the mixture was constituted by hollow Cenosphere type microspheres (relative density 0.75; reference D124 from Schlumberger Dowell) and finely ground quartz (relative density 2.65; reference E600 from Sifraco, France), identical to that used for FIG. 6. The proportions shown for the solid constituents correspond to volume fractions of the solid fraction (BVOB=by volume of blend).

The quantity shown for the additives, dispersing agent and accelerator is the quantity added in grams for a standard volume of 600 ml of cement slurry. The setting accelerator was lithium carbonate and the dispersing agent was citric acid (reference D45 from Schlumberger Dowell).

| # | Ciment Fondu (% vol.) | Hollow spheres (% volume) | Fines (% volume) | Dispersing agent (g/600 ml) | Accelerator (g/600 ml) |
|---|---|---|---|---|---|
| 1 | 40 | 50 | 10 | 0 | 0 |
| 2 | 40 | 50 | 10 | 1 | 0 |
| 3 | 40 | 50 | 10 | 1 | 0.01 |
| 4 | 40 | 50 | 10 | 1 | 0.02 |

The following table shows the results obtained for slurry rheology: $PV^i$: Plastic viscosity $TY^{ii}$: Yield point; $FW^{iii}$: Free water; and $TT^{iv}$:Thickening time. The measurements were carried out at 4° C. under API conditions.

| | $PV^i$ | | $TY^{ii}$ | | $FW^{iii}$ | $TT^{iv}$ |
|---|---|---|---|---|---|---|
| # | cP | Pa · s | lbf/100 ft$^2$ | Pa | ml | h:min |
| 1 | 210 | 0.21 | 23 | 11.01 | 0 | 06:12 |
| 2 | 198 | 0.198 | 2.8 | 1.34 | 0 | >8:00 |
| 3 | 204 | 0.204 | 4.2 | 2.02 | 0 | 05:30 |
| 4 | 216 | 0.216 | 7.1 | 3.41 | 0 | 03:08 |

The tested formulations were perfectly stable and no tendency towards on was observed, as shown by the zero free water volumes. In the absence of agent (test #1), the yield point of the mixture was a little high. However, the setting time remained long. This formulation was thus discarded.

Addition of a dispersing agent (test #2) reduced the yield point but the slurry no longer thickened. This retarding effect was largely compensated for by the addition of a small quanitity of lithium carbonate (test #3). The thickening time was of the order of 3 hours with a lithium salt concentration of 0.033 grams per liter of slurry (test #4).

EXAMPLE 2

The formulations of Example 1 were used—with a fixed porosity of 40%—but part of the aluminous cement was replaced by silica flour (reference D66 from Schlumberger Dowell), variety of silica with a grain size which is very close to that of Ciment Fondu, with a density of 2.65. Slurries #5, #6, #7 and #8 had a density of 1.52 g/cm$^3$ (12.7 ppg),and a slurry #9 had a density of 1.50 g/cm$^3$ (12.5 ppg).

| # | Ciment Fondu (% vol.) | Silica flour (% vol.) | Hollow spheres (% volume) | Fines (% volume) | Dispersing agent (g/600 ml) | Accelerator (g/600 ml) |
|---|---|---|---|---|---|---|
| 5 | 30 | 10 | 50 | 10 | 1.5 | 0 |
| 6 | 30 | 10 | 50 | 10 | 1 | 0.02 |
| 7 | 30 | 10 | 50 | 10 | 1.5 | 0.03 |
| 8 | 30 | 10 | 50 | 10 | 1.5 | 0.06 |
| 9 | 25 | 15 | 50 | 10 | 1.5 | 0.03 |

The formulations tested here had high packing volume fractions (PVF). For tests #5 to #8, the PVF was 0.836. In the last case, it was 0.834.

The results obtained at 4° C. are shown in the following table which also show the comprehensive strength after 6 hours ($^v$) and 24 hours ($^{vi}$).

| | PV | | Ty | | FW | TT | CS 6 h$^v$ | | CS 24 h$^{vi}$ | |
|---|---|---|---|---|---|---|---|---|---|---|
| # | cP | Pa · s | lbf/100 ft$^2$ | Pa | ml | h:min | psi | N/cm$^2$ | psi | N/cm$^2$ |
| 5 | 222 | 0.222 | 2.5 | 1.19 | 0 | >8:00 | zero | | 4300 | 2967 |
| 6 | 232 | 0.232 | 2.2 | 1.05 | 0 | 03:25 | 2833 | 1953 | 4120 | 2843 |
| 7 | 230 | 0.230 | 3.8 | 1.82 | 0 | 02:50 | 3230 | 2229 | 3980 | 2746 |
| 8 | 250 | 0.250 | 12 | 5.75 | 0 | 0:45 | 3700 | 2553 | 4040 | 2788 |
| 9 | 240 | 0.240 | 1.8 | 0.86 | 0 | 03:20 | 2540 | 1753 | 3120 | 2153 |

Again, the formulations containing a lithium salt had very short setting times and very high compressive strengths at these temperatures. Modifying the quantity of accelerator could readily lengthen or retard the setting time, depending on requirements.

The compressive strengths were particularly high. It should be remembered in this respect that values of more than 500 psi are difficult to obtain with prior art compositions at similar temperatures.

EXAMPLE 3

In this example, in the fine fraction of the mixture, the fine quartz was replaced by fly ash which had been passed through a 50 $\mu$ screen (density 2.3 g/cm$^3$).

| # | Ciment Fondu (% vol.) | Silica flour (% vol.) | Hollow spheres (% volume) | Fines (% volume) | Dispersing agent (g/600 ml) | Slurry density (g/cm$^3$) |
|---|---|---|---|---|---|---|
| 11 | 40 | 0 | 50 | 10 | 1 | 1.56 |
| 12 | 30 | 10 | 50 | 10 | 1 | 1.52 |
| 13 | 25 | 15 | 50 | 10 | 1 | 1.50 |

The formulations were tested at 4° C. In this example 3, measurements of the thickening time and compressive strength after 6 hours were not carried out. In this example, the compressive strength at 24 hours had the same significance as the values which could be obtained in the short term in the presence of fly ash.

| | PV | | Ty | | FW | CS 24 h | |
|---|---|---|---|---|---|---|---|
| # | cP | Pa · s | lbf/100 ft$^2$ | Pa | ml | psi | N/cm$^2$ |
| 11 | 266 | 0.266 | 9 | 4.31 | 0 | 4520 | 3119 |
| 12 | 279 | 0.279 | 7 | 3.35 | 0 | 2640 | 1822 |
| 13 | 273 | 0.273 | 6 | 2.87 | 0 | 2280 | 1573 |

Again, the rheologies were very satisfactory (the plastic viscosity may appear a little high but it should be pointed out that as before, the porosity of the slurry was fixed at only 40% and at such a level, it is remarkable in itself that the slurry was perfectly mixable and pumpable).

The compressive strength decreased with the reduction in the quantity of aluminous cement in the slurry. Rheological performances were slightly lower, primarily due to poorer compactness of the mixtures. Formulations containing a low proportion of aluminous cement nevertheless remained advantageous for cases where the exothermicity of the hydration reaction of the cement could cause problems. Further, aluminous cements are far more costly than silica flour.

EXAMPLE 4

This showed that other dispersing agents in current use could be used by testing a formulation with a PNS type dispersing agent (polynaphthalene sulfonate; reference D80 from Schlumberger Dowell) and a PMS type dispersing agent (polymelamine sulfonate; reference D145A from Schlumberger Dowell). The slurries had a density of 1.52 g/cm$^3$. The setting accelerator was lithium carbonate.

| # | Ciment Fondu (% vol.) | Silica flour (% vol.) | Hollow spheres (% volume) | Fines (% volume) | Dispersing agent (type) | Dispersing agent (g/600 ml) | Accelerator (g/600 ml) |
|---|---|---|---|---|---|---|---|
| 14 | 30 | 10 | 50 | 10 | PNS | 3 | 0.03 |
| 15 | 30 | 10 | 50 | 10 | PMS | 3 | 0.03 |

The formulations were tested at 4° C., and exhibited particularly satisfactory performance, as shown in the following table:

| # | PV cP | PV Pa·s | Ty lbf/100 ft² | Ty Pa | FW ml | TT h:min | CS 6 h psi | CS 6 h N/cm² | CS 24 h psi | CS 24 h N/cm² |
|---|---|---|---|---|---|---|---|---|---|---|
| 14 | 235 | 2.35 | 12 | 5.76 | 0 | 2:20 | 2150 | 1482 | 3980 | 2746 |
| 15 | 243 | 0.243 | 17 | 8.16 | 0 | 1:50 | 2200 | 1517 | 3870 | 2670 |

EXAMPLE 5

Two new formulations were prepared using a micronic silica as the fine fraction (average particle diameter: 0.15 $\mu$). The dispersing agent was a PMS (reference D145A from Schlumberger Dowell). The antifoaming agent was reference D047 from Schlumberger Dowell. The slurries had a density of 1.56 g/cm³, corresponding to a porosity of 37.5% (test #16) and 41.4% (test #17) for a respective PVF of 0.875 and 0.857.

| # | Ciment Fondu (% vol.) | Hollow spheres (% volume) | Micro-silica (% volume) | Water (liter/tonne) | Dispersing agent (liter/tonne) | Anti-foaming agent (liter/tonne) |
|---|---|---|---|---|---|---|
| 16 | 39.51 | 48.17 | 12.32 | 287.38 | 3 | 1 |
| 17 | 33.94 | 41.38 | 24.68 | 328.33 | 3 | 1 |

The results of measurements at 4° C. are shown in the table below. The thickening time corresponds to a consistency of 100 BC.

| Slurry property | Test #16 | Test #17 |
|---|---|---|
| Plastic viscosity | | |
| cP | nd | 95.4 |
| [Pa·s] | | [0.954] |
| Yield point | | |
| lbf/100 ft²) | nd | 0.2 |
| [Pa] | | [0.10] |
| Time for achieving a compressive strength of | | |
| 50 psi [34 N/cm²] | 3:16 | 13:58 |
| 500 psi [848 N/cm²] | 4:12 | 15:15 |
| Compresive strength after | | |
| 24 hours (psi) | 3760 | 3349 |
| [N/cm²] | [2593] | [2309] |
| 48 hours (psi) | 4203 | nd |
| [N/cm²] | [2898] | |
| Thickening time | | 3:45 |
| Free water (ml) | | 0 |
| Fluid loss (ml/30 min) | | 40 |

The above examples should not be considered limiting. In particular, the principle of the invention can be applied to cementing compositions of normal density or even of relatively high density. This is accomplished by replacing the hollow microspheres with spherical particles of the same size but higher density.

EXAMPLE 6

Particularly lightened slurries were prepared by adding a gas. In this example the gas nitrogen and the volume (or quality of the foam) corresponded to the volume of gas in the foam cement. The quantities of surfactant, dispersing agent, and accelerator are given by tonne of cement. The volume percentages given for the Ciment Fondu, additional additive (sand or microspheres), micro-silica, and porosity, are relative to the volume of the base slurry before foaming. The porosity of the slurry corresponds to the volume fraction of water in the base slurry, before gas was injected.

| # | Ciment Fondu (% vol.) | Other (% vol.) | Nitrogen (% vol.) | Micro-silica (% vol.) | Surfactant (liter/tonne) | Dispersing agent (liter/tonne) | Accelerator (liter/tonne) | Porosity (% vol.) |
|---|---|---|---|---|---|---|---|---|
| 18 | 70 | 0 | 30 | 0 | 25 | 2 | 0.03 | 58 |
| 19 | 60 | 0 | 30 | 10 | 25 | 1.5 | 0.02 | 40 |
| 20 | 62 | 0 | 25 | 13 | 20 | 1.5 | 0.02 | 45 |
| 21 | 45 | 18[1] | 30 | 7 | 25 | 2 | 0.01 | 40 |
| 22 | 45 | 18[2] | 15 | 13 | 20 | 1.5 | 0.02 | 40 |

[1]sand
[2]hollow microspheres

The compressive strength after 24 hours (at a temperature of 4° C.) was 820 psi for test 18; 980 psi for test 19; 1240 psi for test 20; and 1120 psi for test 21. For test 20, the use of microspheres allows a lighter base slurry to be obtained which correspondingly reduces the quantity of gas. The compressive strength thus obtained is 1560 psi. These values are certainly lower than those obtained when the light material is constituted by hollow microspheres, but are nevertheless remarkably high for a foam cement given a temperature of 4° C.

EXAMPLE 7

Slurries were prepared using particles of styrene-butadiene latex for the fines fraction. The formulations are given in the table below, the percentages being given, depending on the case, by volume of the solid mixture (BVOB), by weight of cement (BWOC), or by gallons per sack of cement (gps).

As stated in the table above, slurries can be obtained having very good rheologies and very low filtrate losses. The results concerning the setting of the cement were also excellent as shown in the following table (the measurements by ultrasound were performed at a pressure of 2068 kPa (3000 psi). The times are expressed in hours:minutes, the compressive strength in kiloPascals.

| # | TT at 9° C. | TT at 20° C. | Measurements by ultrasound at 4° C. | | | |
|---|---|---|---|---|---|---|
| | | | 50 psi | 500 psi | 24 hours | 48 hours |
| 23 | 3:54 | 2:23 | 3:24 | 4:25 | 3806 | 4413 |
| 24 | 3:52 | 0:53 | 7:35 | 9:33 | 1875 | 2206 |
| 25 | 3:43 | 1:00 | 12:44 | 14:13 | 237 | 3420 |
| 26 | >8:00 | 2:10 | 15:30 | 16:43 | 2827 | 4247 |
| 27 | >7:00 | 1:14 | 12:20 | 13:29 | 3454 | 4144 |

| # | Ciment Fondu (% BVOB) | Hollow spheres (% BVOB) | Micro-silica (% BVOB) | Latex (gps) | Citric acid (% BWOC) | Anti-foaming agent (gps) | Anti-sedimentation agent (% BWOC) | $Li_2CO_3$ (% BWOC) |
|---|---|---|---|---|---|---|---|---|
| 23 | 40 | 55 | 5 | — | 0.025 | 0.03 | — | — |
| 24 | 40 | 55 | 5 | 3 | 0.1 | 0.05 | 0.2 | 0.008 |
| 25 | 45 | 55 | — | 3 | 0.1 | 0.05 | 0.2 | 0.01 |
| 26 | 45 | 55 | — | 2.2 | 0.025 | 0.05 | 0.2 | — |
| 27 | 45 | 55 | — | 1.8 | 0.025 | 0.05 | 0.2 | — |

For the reference formulation No. 23 without latex, an anti-foaming agent reference D47 (trademark of Schlumberger Dowell) was used. With latex, the anti-foaming agent used was reference D 144 (trademark of Schlumberger Dowell).

| # | Porosity | Density (g/cm³) | Water/cement ratio | PV at 9° C. cP | PV at 9° C. Pa·s | Ty at 9° C. lb/100 ft² | Ty at 9° C. Pa | Filtrate losses at 9° C. |
|---|---|---|---|---|---|---|---|---|
| 23 | 42.0 | 1.49 | 0.556 | 162 | 0.162 | 3.8 | 1.82 | >1000 ml |
| 24 | 36.1 | 1.46 | 0.506 | 132 | 0.132 | 1.9 | 0.91 | 16 ml |
| 25 | 35.0 | 1.48 | 0.434 | 164 | 0.164 | 6.7 | 3.21 | 22 ml |
| 26 | 37.6 | 1.48 | 0.467 | 131 | 0.131 | 3.4 | 1.63 | 24 ml |
| 27 | 39.0 | 1.48 | 0.483 | 126 | 0.126 | 4.3 | 2.06 | 76 ml |

The porosities took account of the solid fraction provided by the latex. The water/cement ratio was a weight ratio. The filtrate losses were measured in 30 minutes in accordance with API standards.

What is claimed is:

1. A cementing composition that develops greater than about 600 psi compressive strength in about 24 hours comprising a mixture of solids comprising at least one aluminous hydraulic cement constituted by at least 40% of monocalcium aluminate, fine particles, and a light material having a density of less that 0.8; water; a dispersing agent; and a setting accelerator for aluminous hydraulic cement, the ratio of the volume of water to the total volume of the composition being from 0.25 to 0.50.

2. The cementing composition of claim 1 in which the light material comprises hollow microspheres.

3. The cementing composition of claim 1 in which the aluminous hydraulic cement further comprises a diluting agent.

4. The composition of claim 3 in which the diluting agent is present in an amount of from 5 percent to 30 percent by volume of the mixture of solids and is selected from silica flour, fly ash, and blast furnace slag.

5. The cementing composition of claim 4 in which the light material comprises hollow microspheres.

6. The composition of claim 2 in which the fine particles are selected from the group consisting of ground quartz, ground glass, finely ground calcium carbonate, microsilica, carbon black, iron oxide dust, red mud, screened fly ash, and styrene-butadiene latex.

7. The composition of claim 5 in which the fine particles are selected from the group consisting of ground quartz, ground glass, finely ground calcium carbonate, microsilica, carbon black, iron oxide dust, red mud, screened fly ash, and styrene-butadiene latex.

8. The cementing composition of claim 6 in which the dispersing agent is selected from the group consisting of citric acid, a polymelamine sulfonate, and a polynaphthalene sulfonate.

9. The cementing composition claim 1 in which the setting accelerator is a lithium salt.

10. The cementing composition of claim 9 in which the setting accelerator is lithium carbonate.

11. The cementing composition of claim 10 further containing an anti-foaming agent.

12. A cementing composition prepared by mixing solids comprising at least one aluminous hydraulic cement constituted by at least 40% of monocalcium aluminate, fine particles, and a light material having a density of less than 0.8; water; a dispersing agent; and a setting accelerator for aluminous hydraulic cement, the ratio of the volume of water to the total volume of the composition being from 0.25 to 0.50.

13. A cementing composition that develops greater than about 600 psi compressive strength in about 24 hours prepared by mixing solids comprising at least one aluminous hydraulic cement constituted by at least 40% of monocalcium aluminate, fine particles, and a light material having a density of less that 0.8; water; a dispersing agent; and a setting accelerator for aluminous hydraulic cement, the ratio of the volume of water to the total volume of the composition being from 0.25 to 0.50.

14. The composition of claim 13 in which the fine particles are selected from the group consisting of ground quartz, ground glass, finely ground calcium carbonate, microsilica, carbon black, iron oxide dust, red mud, screened fly ash, and styrene-butadiene latex.

15. The cementing composition of claim 14 in which the dispersing agent is selected from the group consisting of citric acid, a polymelamine sulfonate, and a polynaphthalene sulfonate.

16. The cementing composition claim 13 in which the setting accelerator is a lithium salt.

17. The cementing composition of claim 16 in which the setting accelerator is lithium carbonate.

18. A method of cementing a conductor pipe in a deep water well or in an arctic zone comprising cementing the well with a cementing composition comprising a mixture of solids comprising at least one aluminous hydraulic cement constituted by at least 40% of monocalcium aluminate, fine particles, and a light material having a density of less than 0.8; water; a dispersing agent; and a setting accelerator for aluminous hydraulic cement, the ratio of the volume of water to the total volume of the composition being from 0.25 to 0.50.

19. A method of cementing a conductor pipe in a deep water well or in an arctic zone comprising cementing the well with a cementing composition that develops greater than about 600 psi compressive strength in about 24 hours comprising a mixtures of solids comprising at least one aluminous hydraulic cement constituted by at least 40% of monocalcium aluminate, fine particles, and a light material having a density of less than 0.8; water; a dispersing agent; and a setting accelerator for aluminous hydraulic cement, the ratio of the volume of water to the total volume of the composition being from, 0.25 to 0.50.

20. A method of cementing a conductor pipe in a deep water well or in an arctic zone comprising cementing the well with a cementing composition that develops greater than about 600 psi compressive strength in about 24 hours prepared by mixing solids comprising at least one aluminous hydraulic cement constituted by at least 40% of monocalcium aluminate, fine particles, and a light material having a density of less than 0.8; water; a dispersing agent; and a setting accelerator for aluminous hydraulic cement, the ratio of the volume of water to the total volume of the composition being from 0.25 to 0.50.

21. The composition of claim 20 in which the fine particles are selected from the group consisting of ground quartz, ground glass, finely ground calcium carbonate, microsilica, carbon black, iron oxide dust, red mud, screened fly ash, and styrene-butadiene latex.

22. The cementing composition of claim 21 in which the dispersing agent is selected from the group consisting of citric acid, a polymelamine sulfonate and a polynaphthalene sulfonate.

23. The cementing composition claim 20 in which the setting accelerator is a lithium salt.

24. The cementing composition of claim 20 in which the setting accelerator is lithium carbonate.

* * * * *